United States Patent [19]

Heinen et al.

[11] 4,071,253
[45] Jan. 31, 1978

[54] GAS-SEALED SHAFT PACKING

[75] Inventors: Manfred Heinen; Joachim Kotzur, both of Oberhausen, Germany

[73] Assignee: Gutehoffnungshutte Sterkrade A. G., Germany

[21] Appl. No.: 776,869

[22] Filed: Mar. 11, 1977

[30] Foreign Application Priority Data

Mar. 11, 1976 Germany .............................. 2610045

[51] Int. Cl.² ............................................. F16J 15/40
[52] U.S. Cl. ......................................... 277/3; 277/65; 277/74; 277/88
[58] Field of Search ................... 277/3, 65, 74, 88, 15, 277/27, 72 R, 72 FM, 93 SD

[56] References Cited

U.S. PATENT DOCUMENTS

| 2,246,277 | 6/1941 | Davidson | 277/88 X |
|---|---|---|---|
| 2,467,960 | 4/1949 | Brady | 277/74 X |
| 2,710,205 | 6/1955 | Brkich | 277/3 |
| 3,260,530 | 7/1966 | Jelatis et al. | 277/65 X |
| 3,770,179 | 11/1973 | McHugh | 277/65 X |
| 3,804,424 | 4/1974 | Gardner | 277/27 |

FOREIGN PATENT DOCUMENTS

| 217,577 | 10/1958 | Australia | 277/27 |
|---|---|---|---|
| 2,134,964 | 1/1972 | Germany | 277/15 |
| 340,106 | 9/1959 | Switzerland | 277/15 |

Primary Examiner—Robert S. Ward, Jr.
Attorney, Agent, or Firm—McGlew and Tuttle

[57] ABSTRACT

A gas-sealed shaft packing, comprises a rotary sealing ring which is adapted to be fixed to the shaft for rotation therewith and which has respective end surfaces which are spaced apart slightly from respective fixed sealing rings to define a sealing gap on respective sides of the rotary sealing ring. The fixed rings are biased toward the movable ring and gas conduits extend from a housing into each fixed ring and terminate in the gap between the fixed ring and the associated rotary sealing ring. The fixed rings are held by flange members which extend radially inwardly from the housing toward the shaft and resilient diaphragms are disposed between the flanges and the fixed rings or non-rotatable rings so as to urge them toward the rotatable sealing ring carried by the shaft. The biasing means also divides the housing to a space adjacent the shaft on one side of the diaphragms and a space adjacent the housing on the other side and gas is delivered into the gap through a conduit connected into each fixed ring and it escapes in both radial directions in respect to the shaft into the associated spaces on each side and then flows through an outlet conduit which may be advantageously regulated by a valve.

6 Claims, 3 Drawing Figures

GAS-SEALED SHAFT PACKING

FIELD AND BACKGROUND OF THE INVENTION

This invention relates in general to the construction of sealing devices for shafts and movable parts and, in particular, to a new and useful gas-sealed shaft which includes a non-rotatable sealing ring on each side of a rotary sealing ring carried by a shaft which is spaced apart from the shaft to define a sealing gap therebetween and which also includes means for directing a gas into the sealing gap through each fixed ring.

DESCRIPTION OF THE PRIOR ART

The present invention relates to a gas-sealed shaft packing comprising at least one fixed sealing ring and a rotary sealing ring which rotates with the shaft and is mounted axially adjacent the fixed ring, as well as resilient means which push the fixed sealing ring against the rotary sealing ring, and feed conduits which convey a sealing gas into the zone of the seal gap between the sealing rings.

Known gas-sealed packings comprise a single sealing ring which is resiliently suspended from the housing by means of a gas-tight diaphragm by which it is pushed against another sealing ring rotating with the shaft. In operation, a gas stream, blown between the two sealing rings, separates the contact surfaces of the rings and forms a gas cushion which prevents a wearing of the rings.

The axial pressure and the frictional heat produced by the sealing gas, with a unilateral arrangement of the radial sealing surface, results in irregular deformations of the rotary sealing ring. At high differential pressures and high speeds, the deformations may be of the order of magnitude of the seal gap height which is extremely small in this type of sealing, so that the rotary ring and the fixed ring may come into contact axially with the result of wearing of the sealing surfaces.

In such cases, it is necessary to combine the sealing-gas packing with another conventional packing by which the high differential pressure is absorbed. However, with equal pressures on both sides of the seal, such a combination is needed if the sealing gas, compatible with the operational gas, is not compatible with the medium present in the space exterior to the sealing-gas packing, which is usually the surrounding air.

While the use of conventional gas-tight packings, for example, labyrinth packings, considerable gas leakage to the outside is to be taken into account for the outer sealing, while, with an outer sealing in the form of a liquid packing, an expensive degasifying system for the sealing liquid would be required in cases where the sealing gas of the inner packing is explosive or toxic. In addition, liquid packings result in high mechanical frictional losses which may even prohibit the use of a sealing liquid at high speeds.

SUMMARY OF THE INVENTION

The present invention is directed to a gas-sealed shaft packing by which the operational space is sealed off hermetically, deformations at high differential pressures and circumferential speeds are avoided, and the use of a conventional outer sealing system is made unnecessary.

It has been found that all of these problems can be solved by providing a gas-sealed packing in which the rotary sealing ring is disposed between two fixed sealing rings and a separate sealing-gas feed conduit is associated with each of the two fixed sealing rings, with the conduit being formed, at least partially, of bores, which extend within the sealing rings.

By producing frictional heat simultaneously on both radial surfaces of the rotary sealing ring, the temperature is distributed more uniformly and the deformation of the rotary ring due to thermal influences is reduced. This is of particular importance at high speeds at which a greater amount of frictional heat is produced in the sealing gas in the seal gap. Deformations of the rotary ring due to pressure difference are largely avoided by the fact that the radial sealing surfaces of the rotary ring on both sides are exposed to axial forces which largely compensate each other so that no cambering of the ring in the axial direction occurs. In addition, the differential pressure between the operational gas and the outer air can be distributed between the two gas seals. By providing a sealing gas which is compatible with the outer air for the outer seal, the advantage is obtained that the consumption of sealing gas is minimized and the use of a liquid packing with an expensive degasifying system for the sealing liquid becomes unnecessary.

The novel packing system may be designed so that, in practice, no deforming forces at all become effective on the rotary ring. This is obtained, in accordance with a development of the invention, by mounting the rotary ring between two elements which rotate with the shaft and which are yielding and, at the same time, seal but do not absorb any axial forces.

The pressure forces which are exerted from both sides of the rotary ring on the radial seal surfaces and which depend on the axial range of the suspension system of the fixed sealing rings are automatically compensated, due to the fact that the rotary ring mounted on the shaft occupies an axial position in which these forces cancel each other. The absence of an axial loading of the rotary ring makes it possible to use narrow rings so that the out-of-balance forces are reduced and a much higher maximum admissible speed can be provided.

A further feature of the invention is that the bores for feeding the sealing gas terminate in sickle-shaped recesses.

Accordingly, it is an object of the invention to provide an improved shaft gas-sealed packing which includes a non-rotatable seal bearing on each end of a seal ring which is secured to the shaft for rotation therewith, the space between the fixed and the rotary seal rings defining sealing gaps, and wherein, a gas is directed into the sealing gaps on each end of the rotary seal ring by passages defined in the fixed rings.

A further object of the invention is to provide a gas-sealed shaft packing which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there are illustrated preferred embodiments of the invention.

DESCRIPTION OF THE PREFERRED EMBODIMENTS

Figure 1:
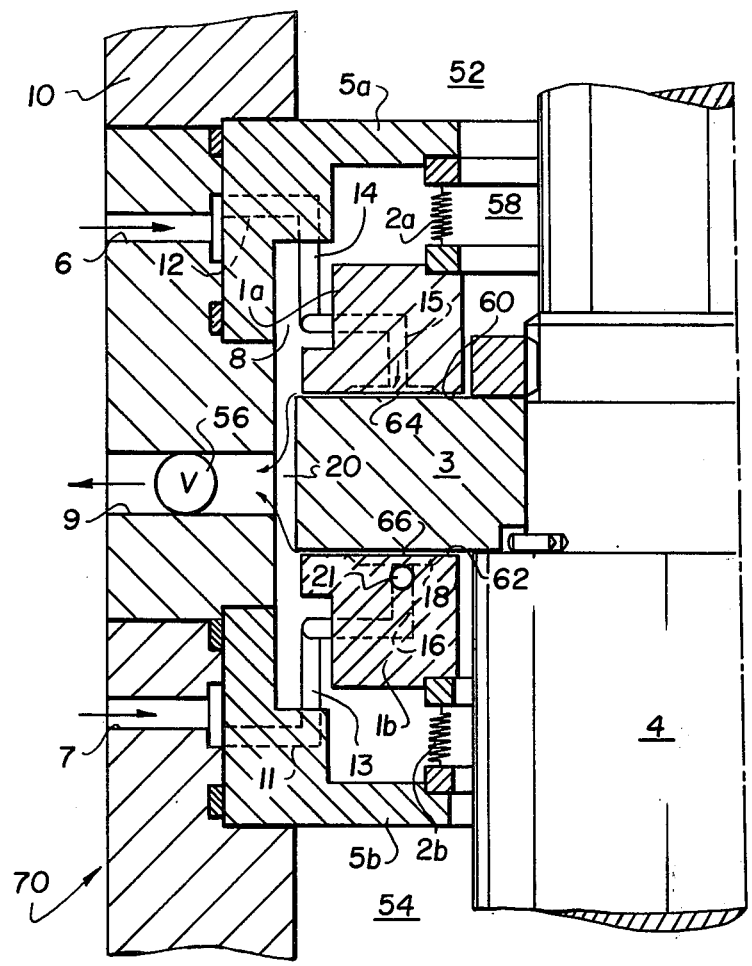
FIG. 1 is a sectional view of a shaft packing constructed in accordance with the invention.
Figure 2:
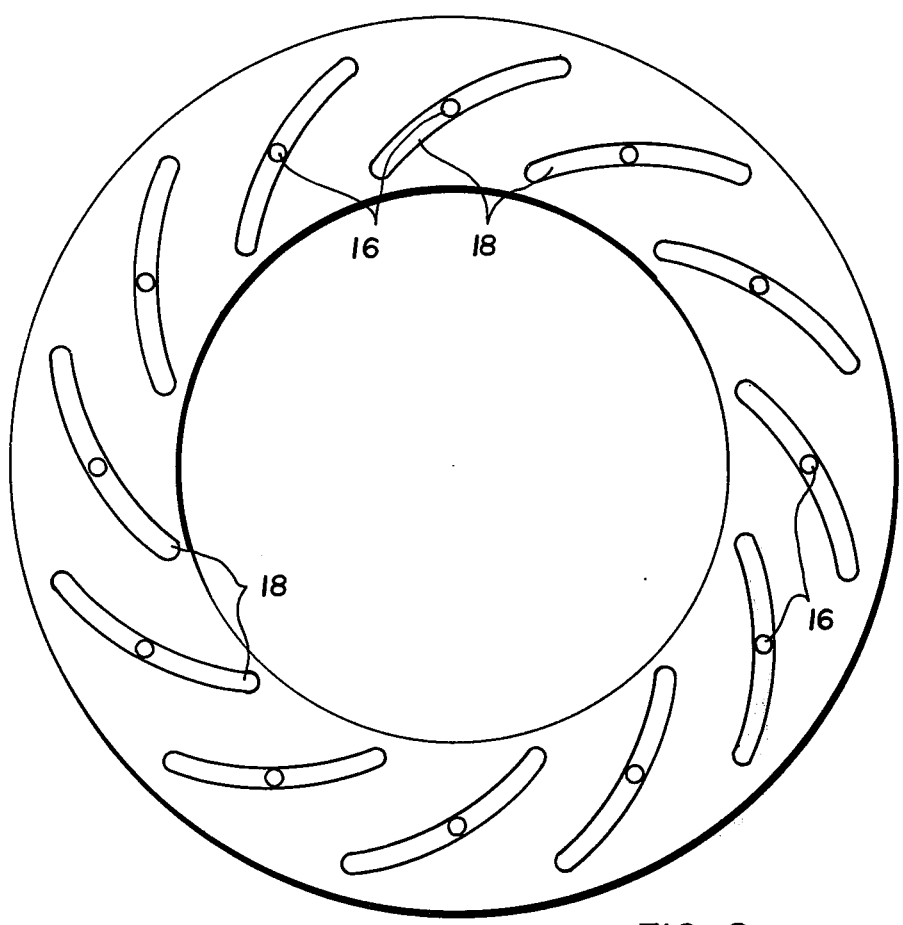
FIG. 2 is a top plan view of the contact surface of the fixed sealing ring provided with sickle-shaped recesses.

Referring to the drawings in particular, the invention embodied therein in FIGS. 1 and 2 comprises a gas-sealed shaft packing for a rotary shaft 4, for example, of a gas compressor, which extends from a housing 70 which is under excess pressure. The shaft packing provides a seal between the working space 52 and the outer air 54. A rotary sealing ring 3 is secured to shaft 4 for rotation therewith.

The shaft is surrounded by a housing wall 10 in the zone of the shaft packing from which two housing flanges 5a and 5b project inwardly toward shaft 4. The housing flanges have a substantially L-shaped cross-section, with one leg of the L extending parallel to the inside surface of the housing and being gas-tightly connected to the housing wall, and the other leg of the L projecting freely inwardly.

Sealing diaphragms 2a and 2b are connected between respective non-rotatable sealing rings 1a and 1b on respective sides of the seal ring 3 and the free legs of housing flanges 5a and 5b which are of symmetrical shape relative to the rotary sealing ring 3. The sealing diaphragms 2a and 2b are secured with two purposes. First, they constitute a seal between the annular space 20 adjacent the housing and the annular space 58 adjacent the shaft 4. Second, they embody a pair of accumulators of elastic force pushing the fixed sealing rings 1a and 1b against the rotary sealing ring 3. The pressure surfaces 60 and 62 of rings 1a and 1b oppose respective sides of the sealing ring 3 and are spaced from each side by a small distance or seal gap 64 and 66, and the interspace thus formed is under gas pressure. The seal gaps 64 and 66 permit a motion of the sealing rings relative to each other without appreciable frictional losses.

The sealing gas or gases are supplied through feed conduits, beginning with the first conduits 6 and 7 extending through the housing wall 10 and are connected to exterior supply lines outside the housing wall (not shown). The sealing gas is further directed through bores 11 and 12 extending in an angle through housing flanges 5a 5b. At the end of respective bores 11 and 12, small bent tubes 13 and 14 are provided establishing communication between these bores and further respective bores 15 and 16 which are provided in the fixed sealing rings 1a, 1b. Bores 15 and 16 terminate in enlarged outlets 18 at the seal gaps 64 and 66. The enlargement of the outlets 18 may be of the configuration shown in FIG. 2. Here, sickle-shaped outlets 18 are designed for providing a better distribution of the sealing gases.

The escaping gases pass from the seal gap between the sealing rings partly into the space 20 between the sealing rings and the housing wall and, therefrom, into a common discharge conduit 9. The other part passes into the space 58 between the shaft and the sealing rings and, therefrom, either to the outside or to the inside, into contact with the gases in the operational space of the respective machine in which the shaft packing is used.

The function of the shaft packing may be learned from FIG. 1. For example, through the conduits of the packing stage at the inside, a sealing gas compatible with the operational gas is fed in. The packing stage at the outside is operated with an inert sealing gas which is allowed to escape to the outer air, because it is harmless. Due to the mixing of this inert sealing gas with the sealing gas which passes into the mixing space from the inside sealing ring and which might be explosive, dangerous chemical reactions are avoided. The mixture of sealing gases accumulating in space 20 is discharged and rendered harmless.

Pressure-regulating or throttle valves may be provided in the feed and discharge system of the sealing gases or sealing gas mixtures. It is possible, for example, to mount a throttle valve 21 at the end of bore 15 within sealing ring 1b. A pressure-regulating valve 56 may also be provided at the end of conduit 9, whereby, the adjusted intermediate pressure between the operational pressure and the atmospheric pressure is kept constant. In this way, it is possible to provide a two-stage pressure buildup within the packing, while using two different sealing gases. An expensive liquid packing is saved and, additionally, a hermetic sealing with a minimized sealing-gas consumption is obtained.

It is usual to provide more than two feed conduit arrangements which are distributed around the shaft. Pressure ratios, gap widths, and similar values and dimensions result from the requirements and experiences in the respective case of application.

Figure 3:
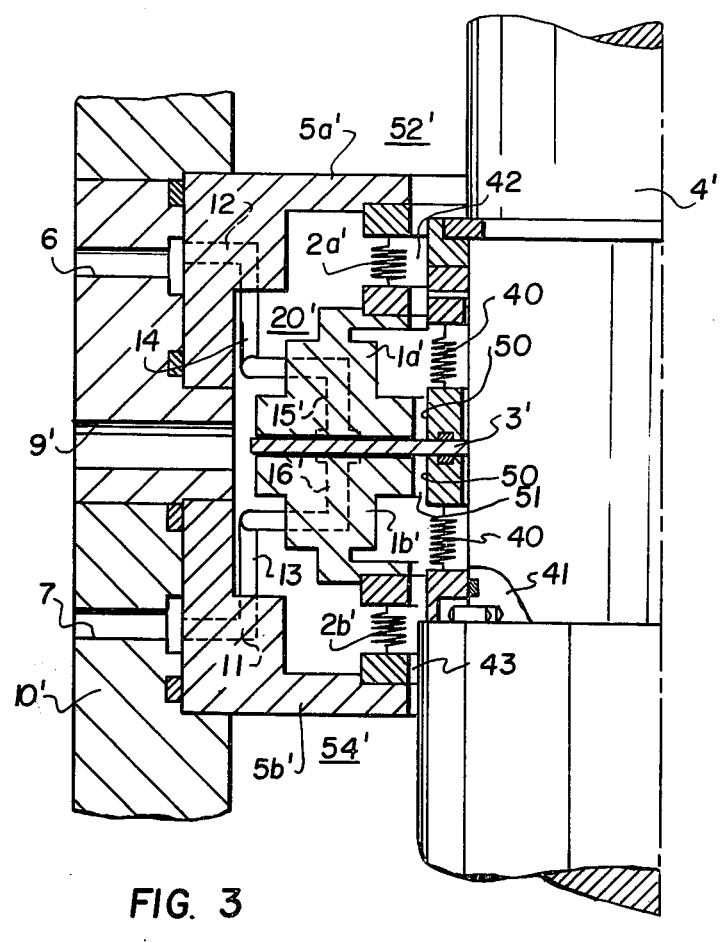
FIG. 3 is a view similar to FIG. 1 of another embodiment of shaft packing.

In another embodiment of the invention, as seen in FIG. 3, the shaft packing is designed so that each of the two fixed non-rotatable rings 5a and 5b is gas-tightly secured to the housing wall 10' by means of an elastic wall and the rotary sealing ring 3' is gas-tightly secured to the shaft 4, on both sides, by means of resilient sleeves. The spaces between the shaft and the fixed rings communicating with the operational space and with the outside, are made as small as possible.

In FIG. 3, again, the operational space 52' is shown in the upper part and the ambient space 54' in the lower part. The rotary shaft 4' is connected to the rotary sealing ring 3'.

Shaft 4' is surrounded by housing wall 10' in the zone of the shaft packing, from which the two housing flanges 5a' and 5b' project inwardly toward the shaft. The cross-section of the housing flanges is similar to that of the first embodiment shown in FIG. 1. The flanges are symmetrically arranged relative to rotary sealing ring 3'. Sealing diaphragms 2a', 2b' are secured between respective flanges 5a' and 5b' and rings 1a' and 1b' and they gas-tightly separate the annular space 20' adjacent the housing from the annular space 58 adjacent the shaft. The diaphragms 2a' and 2b' embody accumulators of resilient force by which the two symmetrically arranged fixed sealing rings 1a' and 1b' are pushed toward rotary sealing ring 3', with a small seal gap left between the presssure surfaces of sealing rings 1a', 1b', and 3', which gap is kept under gas pressure.

The sealing gas or gases are supplied through similar conduits as already described in connection with FIG. 1. Bores 15' and 16' terminate in the zone of the seal gaps between the sealing rings. The escaping gases pass from the seal gap between the sealing rings partly into space 20'and from there into a common discharge conduit 9'. The other part of the gases passes into the space between the shaft and further resilient sleeves, particularly into space 50 described in the following.

Resilient sleeves 40, which rotate with shaft 4', are secured to the shaft through fastening mechanisms 41.

The rotary ring 3' is secured to the shaft through resilient sleeves 40 and is not directly connected to shaft 4'. The rotary ring 3' can adjust its axial position on the shaft, depending on the pressure load to which it is exposed.

A pressure balance is produced through passages 42 or 43 communicating with the operational space 52' and the outer air space 54', respectively, resulting in a force equilibrium. Consequently, the sealing elements of the packing are not deformed.

Since the width of the gaps between the sealing rings can be adjuted automatically by means of the sealing gas provided separately for each individual seal, a contact-free function of the seal is ensured. The rotary sealing ring 3' is also mounted between resilient sleeves and is therefore axially displaceable.

While specific embodiments of the invention have been shown and described in detail to illustrate the application of the principles of the invention, it will be understood that the invention may be embodied otherwise without departing from such principles.

What is claimed is:

1. A gas-sealed shaft packing, comprising a rotary sealing ring adapted to be fixed to the shaft for rotation therewith, and having first and second movable ring seal surfaces on respective ends thereof, first and second fixed sealing rings having respective first and second fixed ring surfaces opposed to respective ones of said rotary sealing ring first and second ring seal surfaces and spaced away from said surfaces to define respective first and second sealing gaps therebetween, resilient means biasing said first and second fixed rings toward said rotary seal ring, separate first and second sealing gas feed conduits connected to each of said first and second fixed sealing rings and including a conduit portion extending through respective first and second fixed sealing rings and terminating in the respective first and second sealing gaps.

2. A gas-sealed shaft packing, according to claim 1, including housing means defining a space around said shaft before said first fixed sealing ring as the working space of the device and the space surrounding said shaft adjacent said second fixed sealing ring being exposed to atmosphere, said first sealing gas feed conduit supplying an inert sealing gas compatible with the atmosphere to said fixed sealing ring which is located toward the atmosphere side and said second sealing gas conduit supplying an inert gas compatible with the gas sealed off in the working space adjacent the other of said fixed sealing ring and including a common discharge defined by said housing means for the discharge of the gases from each of said first and second sealing gaps.

3. A gas-sealed shaft packing, according to claim 1, wherein the bores defined through said first and second fixed sealing rings terminate in openings at said sealing gap of sickle-shaped configurations.

4. A gas-sealed shaft packing, according to claim 1, including a housing surrounding said shaft, first and second L-shaped flange members having parallel portions in said housing and having radially extending portions extending toward said shaft at spaced longitudinal locations, said resilient means including a diaphragm extending from the portion of said flanges extending radially into said housing toward said shaft to said associated first and second fixed sealing rings.

5. A gas-sealed shaft packing, according to claim 1, including first and second sealing sleeves carried by said shaft on respective sides of said rotary seal ring and rotary seal biasing means extending between respective first and second sleeves to respective sides of said rotary seal ring to bias the sealing ring into a neutral position.

6. A gas-sealed shaft packing, according to claim 5, including a housing surrounding said shaft, first and second flange members secured to said housing and having radially extending first and second portions disposed on respective sides of said rotary seal ring and diaphragm biasing means extending between said radially extending portion of said flange and the associated first and second fixed seal ring.

* * * * *